(12) United States Patent
Schmidt (10) Patent No.: US 9,256,890 B1
(45) Date of Patent: Feb. 9, 2016

(54) FRAMEWORK FOR GEOLOCATION-BASED CUSTOMER-TO-PRODUCT MATCHING HOSTED IN A CLOUD-COMPUTING ENVIRONMENT

(71) Applicant: Olaf Schmidt, Walldorf (DE)

(72) Inventor: Olaf Schmidt, Walldorf (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/499,975

(22) Filed: Sep. 29, 2014

(51) Int. Cl.
*G06K 15/00* (2006.01)
*G06Q 30/02* (2012.01)

(52) U.S. Cl.
CPC ........ *G06Q 30/0261* (2013.01); *G06Q 30/0258* (2013.01); *G06Q 30/0267* (2013.01); *G06Q 30/0269* (2013.01)

(58) Field of Classification Search
CPC .............. G06Q 30/02; G06Q 30/0261; G06Q 30/0267; G06Q 10/10; G06Q 20/108; G06Q 20/20; G06Q 20/3274; G06Q 20/3276; G06Q 30/0205; G06Q 30/0207; G06Q 30/0239; G06Q 30/0249; G06Q 30/0253; G06Q 30/0254
USPC .................. 235/383, 375, 380, 382, 381, 492
See application file for complete search history.

(56) References Cited

U.S. PATENT DOCUMENTS

| | | | |
|---|---|---|---|
| 7,457,933 B2 | 11/2008 | Pferdekamper et al. | |
| 7,653,667 B2 | 1/2010 | Pferdekamper et al. | |
| 7,707,176 B2 | 4/2010 | Schmidt | |
| 7,756,813 B2 | 7/2010 | Pferdekamper et al. | |
| 7,827,160 B2 | 11/2010 | Kuhr et al. | |
| 7,844,890 B2 | 11/2010 | Schmidt | |
| 7,975,013 B2 | 7/2011 | Schmidt | |
| 8,090,754 B2 | 1/2012 | Schmidt et al. | |
| 8,219,974 B2 | 7/2012 | Schmidt | |
| 8,484,206 B2 | 7/2013 | Schmidt et al. | |
| 8,635,684 B2 | 1/2014 | Thun | |
| 8,719,833 B2 | 5/2014 | Schmidt | |
| 2007/0050191 A1* | 3/2007 | Weider et al. ................. | 704/275 |
| 2008/0154977 A1 | 6/2008 | Schmidt | |
| 2008/0243781 A1 | 10/2008 | Kuhr et al. | |
| 2008/0263007 A1 | 10/2008 | Schmidt | |
| 2009/0150168 A1 | 6/2009 | Schmidt | |
| 2009/0150431 A1 | 6/2009 | Schmidt et al. | |
| 2009/0150866 A1 | 6/2009 | Schmidt | |
| 2009/0150906 A1 | 6/2009 | Schmidt et al. | |

(Continued)

OTHER PUBLICATIONS

U.S. Appl. No. 13/543,254, filed Jul. 6, 2012, Olaf Schmidt.

(Continued)

*Primary Examiner* — Thien M Le
(74) *Attorney, Agent, or Firm* — Fish & Richardson P.C.

(57) ABSTRACT

The present disclosure describes methods, systems, and computer program products for providing an on-demand, cloud-based platform exposing a geolocation service. One computer-implemented method includes storing, in a persistence, customer master data received as part of a customer registration process, storing, in the persistence, customer preferences received in a customer-created product preferences list, receiving geolocation updates from a customer mobile device, determining if there is a match between a particular customer preference and a product in a product catalog based on received customer preferences and the customer location based on the received geolocation updates, transmitting generated determined matches to display on a map to the customer mobile device, and transmitting online navigation data to the customer mobile device.

17 Claims, 4 Drawing Sheets

(56) References Cited

U.S. PATENT DOCUMENTS

| | | |
|---|---|---|
| 2010/0287553 A1 | 11/2010 | Schmidt et al. |
| 2011/0015987 A1* | 1/2011 | Chakraborty et al. ..... 705/14.39 |
| 2011/0321058 A1 | 12/2011 | Schmidt |
| 2012/0030180 A1 | 2/2012 | Klevenz et al. |
| 2012/0246130 A1 | 9/2012 | Schmidt |
| 2013/0018926 A1 | 1/2013 | Schmidt et al. |
| 2013/0027227 A1* | 1/2013 | Nordstrom ................... 340/990 |
| 2013/0073388 A1* | 3/2013 | Heath ........................ 705/14.53 |
| 2013/0117289 A1 | 5/2013 | Fischer et al. |
| 2013/0179265 A1* | 7/2013 | Winslade ................... 705/14.58 |
| 2013/0238455 A1* | 9/2013 | Laracey ......................... 705/21 |
| 2013/0344852 A1* | 12/2013 | Kolodziej ................. 455/414.1 |
| 2014/0012767 A1 | 1/2014 | Schmidt |
| 2014/0089956 A1* | 3/2014 | Shah et al. ..................... 725/14 |
| 2014/0123263 A1 | 5/2014 | Thun |
| 2014/0172627 A1* | 6/2014 | Levy et al. ................... 705/26.7 |

OTHER PUBLICATIONS

U.S. Appl. No. 13/575,158, filed Feb. 1, 2013, Olaf Schmidt et al.
U.S. Appl. No. 13/738,686, filed Jan. 10, 2013, Olaf Schmidt.

* cited by examiner

FRAMEWORK FOR GEOLOCATION-BASED CUSTOMER-TO-PRODUCT MATCHING HOSTED IN A CLOUD-COMPUTING ENVIRONMENT

BACKGROUND

Various geolocation technologies are used to locate a user at a geographical position and are no longer used exclusively with special/dedicated devices (e.g., global positioning system (GPS) navigation systems). Integration of geolocation technology within mobile devices (e.g., smartphones and tablet computers) has greatly increased the popularity of the technologies and allowed geolocation applications and functions to be developed and used by a mobile device user. For example, mobile devices have incorporated GPS receivers that permit determination and management of global positioning using GPS satellites and allow the current position of a mobile device owner to be identified online with high-precision. However, current location-based services are focused on a mobile device owner's current location as opposed to where the mobile device owner plans/is projected to be. The lack of ability to determine the mobile device owner's future position results in, among other things, a loss of marketing/business opportunities, a loss of sales, and/or a failure to develop enhanced, cloud-based, mobile device applications.

SUMMARY

The present disclosure relates to computer-implemented methods, computer-readable media, and computer systems for providing an on-demand, cloud-based platform exposing a geolocation service. One computer-implemented method includes storing, in a persistence, customer master data received as part of a customer registration process, storing, in the persistence, customer preferences received in a customer-created product preferences list, receiving geolocation updates from a customer mobile device, determining if there is a match between a particular customer preference and a product in a product catalog based on received customer preferences and the customer location based on the received geolocation updates, transmitting generated determined matches to display on a map to the customer mobile device, and transmitting online navigation data to the customer mobile device.

Other implementations can include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the customer preferences are based on data obtained from the product catalog stored in the persistence.

A second aspect, combinable with any of the previous aspects, wherein the store locations and the retailer master data are received from retailers as part of at least a retailer registration process.

A third aspect, combinable with any of the previous aspects, determining initial matching between the customer master data, the customer preferences, store locations, and retailer master data; and responsive to a determination of initial matching, generating a push notification for transmission to the customer.

A fourth aspect, combinable with any of the previous aspects, as part of the determination of initial matching: obtaining product locations and customer preference locations from the persistence and filtering matches between the customer master data, the customer preferences, the store locations, and the retailer master data by price ranges associated with the customer preferences.

A fifth aspect, combinable with any of the previous aspects, further comprising transmitting a determined match to the retailer used by the retailer to transmit any special conditions related to the match to the customer mobile device.

A sixth aspect, combinable with any of the previous aspects, further comprising: receiving an indication of grouping from a plurality of customers seeking to receive special prices or product offerings by retailers associated with a geographical region, determining if the plurality of customers are interested in a particular product in the geographical region, and transmitting a special price or product offering to one or more customers of the plurality of customers.

The subject matter described in this specification can be implemented in particular implementations so as to realize one or more of the following advantages. Advantages can be for both types of end users (e.g., customers/buyers and retailers). First, advantages for customers/buyers include:
- Information regarding products of interest are provided on mobile devices taking into account the geo location of the potential customer
- Best price offerings are presented on the mobile device of a potential customer/buyer taking into account the geo location.
- Routing information to the corresponding product (shop) is automatically provided.
- "Crowd buying" functionality. The platform could automatically detect if several potential customers are interested in a certain product in a defined region. These customers could team up (e.g., build a crowd) to get special prices/offerings by retailers in the corresponding region. As soon as a crowd has established, this information can be sent to retailers in the given region and he retailers can decide if they would like to make a special offering.

Advantages for retailers include:
- Retailers are automatically informed if a potential customer is interested in a particular product.
- Retailers know actual price ranges potential customers are willing to pay in certain regions.
- Retailers know the location (current and/or planned) of potential customers.
- Retailers can create special offerings for particular customers and send the offering directly to the corresponding mobile device.
- Platform supports acquisition of new customers.
- Analytics functionality is provided which allows retailers to analyze the demands and behavior of potential customers.

Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

Geolocation is the identification of a real-world geographic location (e.g., by latitude and longitude) of an object (e.g., a person, device, etc.) and may refer to assessing a location or to the actual assessed location. While geolocation is closely related to the use of positioning systems (e.g., the global positioning system (GPS)), geolocation can also be distinguished by a greater emphasis on determining a meaningful location (e.g. street address) rather than a set of geographic coordinates. Geolocation can also determine the way in which the information necessary for the geolocation is acquired (e.g., through identification of an internet protocol (IP) address of a device connected to the Internet, the network provider or mobile device GSM network, through the GPS system, etc.).

Some geolocation technologies include:
GPS: Modern browsers allow obtaining information from a GPS receiver. This technology is very common in the case of mobile devices. While GPS is relatively slow, it is very accurate, reliable, and a large coverage area.
Wi-Fi Network Proximity: Analyzes names and MAC addresses of nearby WI-FI networks to determine a geolocation. Accuracy is reasonably high. When coupled with GPS, determined WI-FI network locations can be stored and geolocation determination can be made indoors where GPS signals are weak or non-existent.
Mobile repeater triangulation: This method is mostly used on mobile device browsers and is based on a relative distance to various mobile network cell phone towers. Triangulation is fast but expensive and suffers in rural environments with a lack of cell phone towers (as compared to a densly-populated urban environment with many cell phone towers).
IP Address: This technology is typically the least accurate and uses the IP address associated with a mobile device service provider (ISP) to determine, typically, the city where the ISP has a data center.
RFID: This technology can be used to detect proximity to a mobile device using a radio frequency identification chip embedded within a mobile device. Short range, but provides very accurate location data. For example, an RFID scanner can be mounted on a wall of a storefront along a sidewalk. Nearby mobile devices can respond with an identification when the pass the RFID scanner.

As will be appreciated by those or ordinary skill in the art, the preceding list of example geolocation technologies is not exhaustive and is provided only to enhance understanding of the described subject matter. This list is not meant to limit the applicability of the subject matter in any way.

Various geolocation technologies (including those not mentioned above) can be used to locate a user at a geographical position and are no longer used exclusively with special/dedicated devices (e.g., dedicated GPS navigation systems). Integration of geolocation technology within mobile devices (e.g., smartphones and tablet computers) has greatly increased the popularity of the technologies and allowed geolocation applications and functions to be developed and used by a mobile device user. For example, mobile devices have incorporated GPS receivers that permit determination and management of global positioning using GPS satellites and allow the current position of a mobile device owner to be identified online with high-precision. However, current location-based services are focused on a mobile device owner's current location as opposed to where the mobile device owner plans/is projected to be. The lack of ability to determine the mobile device owner's future position results in, among other things, a loss of marketing/business opportunities, a loss of sales, and/or a failure to develop enhanced, cloud-based, mobile device applications.

In a service where potential buyers (customers) announce their intentions to go somewhere and/or do something (e.g., visit a mall or take a vacation to a popular resort) and/or where a history of potential customer actions permits a projected action (e.g., based on a mobile device user's specifically traveled route every Friday to their place of employment), a location-based service can act accordingly and support retailers and/or customers based, at least in part, on user-based preferences. For example, one typical real-world problem is to bring together potential customers and retailers in a location in which there are many stores (e.g., a mall, city, etc.). Currently this is done by advertising in online and offline media. Customers usually want to buy products in a certain price range and retailers offer products in certain price ranges with special conditions (e.g., discounts, special offerings, etc.). It is difficult for customers to get a succinct overview of available products and price ranges when they go shopping in particular location in which there are many stores, and customers often spend a lot of time physically visiting various shops to look for products of interest. On the other hand, retailers (especially those with non-attractive locations) would prefer to directly address customers who are interested in certain products in given price range in an attempt to capture their business and maximize sales.

The ability to determine a customer's current/projected location and to have access to preferences associated with the customer would permit the retailer to target customers with particular discounts, special offerings, etc. At a high level, this disclosure describes a cloud-based framework which permits bringing together customers and retailers based on geolocations, actual preferences, and currently available offerings.

The described geolocation service is exposed by an on-demand, cloud-computing-based framework and can, in some implementations, act as online shopping assistance for customers and a direct channel to customers for registered retailers. In some implementations, some or all of the following functionality can be provided by the service:

- Retailers and customers can register with the platform
- Customers provide information about products of interest and the prices they are willing to pay on a certain date (including geolocations of interest)
- Customers provide online location information using mobile devices using, for example, a provided mobile application. Location can indicate a position in a city, etc.
- Customers can enter a request for an individual offering, which is forwarded to relevant retailers willing to provide individual offerings.
- Retailers provide information about products they sell, price ranges, and special conditions as well as shopping geolocations
- The platform tracks the position of customers and matches their "wish list" with offerings of retailers which are nearby. Best-matches and "hit lists" based on prices and distances to shops are provided.
- The platform provides navigation assistance to selected shops including sending notifications when a customer passes a shop with special offerings (e.g., vibration, ring tone, text message, phone call, etc.)
- The platform provides analytics functionality for retailers (e.g., analysis of customer wish lists and prices customers are willing to pay in certain cities, etc.)
- Retailers can adapt their offerings in real-time according to customer-demands and publish their adapted offerings.
- Customers are notified on changes.
- Real-time analytics functionality is provided by the platform. Based on current data, retailers can adapt their product portfolio to customer demands.
- Based on a customer's history a retailer can offer individual conditions.
- Customers can, for example using an offered mobile application, make specific requests (bargain) with retailers before physically entering the sales location (e.g., while having lunch in a nearby restaurant).
- Unique tickets for special offerings can be generated by the platform and send to customer mobile devices. The tickets can be utilized to buy products with individual conditions unique to the ticket holder.
- "Crowd buying" functionality. The platform could automatically detect if several potential customers are interested in a certain product in a defined region. These customers could team up (e.g., build a crowd) to get special prices/offerings by retailers in the corresponding region. As soon as a crowd has established, this information can be sent to retailers in the given region and he retailers can decide if they would like to make a special offering.

As will be appreciated by those of ordinary skill in the art, the preceding list of example functionality is not exhaustive and is only provided to enhance understanding of the described subject matter. This list is not meant to limit the applicability of the subject matter in any way.

In some implementations, typical interactions with the described service can include:

1. A customer registers with the platform service. The corresponding customer master data (e.g., name, address, etc.) is created. The customer can access the platform services using a registered mobile device (e.g., a native application installed and registered with the service) or using a web-application inside a browser to access the platform services.
2. A customer creates a list with product preferences (e.g., a wish list) they would like to buy. The list contains information regarding the location of the product, a price range for each product the customer is willing to pay and a timeframe for the shopping trip (e.g., data, start time, end time, etc.).
3. The created list is uploaded to the cloud service and stored in the customer preferences persistence.
4. An initial matching of customer preferences and the stores product catalog is done by the cloud service. The matching algorithm takes into account the geolocations provided by the customer preferences list and the geolocations of the retailer shops. The geolocation-based matching is done using the geo spatial engine. The result list with matches of products to customer preferences based on geolocations is then filtered by the provided price ranges. The calculated matches an according push notification is send to the mobile device of the customer and to his inbox, which can be accessed using the mobile app or the web application.
5. At any time the customer signals the platform that a shopping trip into a certain area has started.
6. The current customer geolocation is send to the cloud service on a regular basis (e.g., a defined interval—every X minutes or based on distance moved geographically, etc.).
7. On every location update, the cloud service calculates if there is any match between a customer preference and an actual product in the product catalog based on the provided criteria (e.g., location, price range, etc.). Several matching types are calculated (e.g., closest hit, best price, etc.) and sent to the customer's mobile device.
8. Potential customer-to-product matches are sent to the corresponding retailers and the retailers can decide to make special prices or conditions for this customer in order to make an offer more attractive. Such a special offer (e.g., for high-price or specialty products) are pushed immediately to the customers device (e.g., using push notifications, text messages, phone calls, etc.).
9. The matches are visualized on the customer's mobile device. Various visualization modes will be supported (e.g., maps, lists, etc.).
10. The customer can request detailed information from the product catalog according to every identified match using a cloud service request.
11. If the customer decides to buy an offered product, the routing information to the corresponding shop of the retailer is provided by the cloud service (e.g., a navigation functionality).

As will be appreciated by those of ordinary skill in the art, the preceding list of example interactions is not exhaustive and is only provided to enhance understanding of the described subject matter. This list is not meant to limit the applicability of the subject matter in any way.

In typical implementations, customer locations and product locations are tracked and mapped to structured data stored in a database (e.g., product price ranges, customer preferences, etc.). Geo spatial extension functionalities (e.g., provided by a geo spatial software engine, application logic upgrades, etc.) provide special data structures and geo spatial algorithms which are located in a database layer of a database (typically an in-memory, column-store database for performance reasons—therefore geolocation-based calculations can be executed extremely fast in memory based on the special data types/structures introduces by the geo spatial extension (e.g., geolocation points, geolocation ranges, etc.). Data typically used in a retailer scenario (e.g., product information, customer interests, etc.) is enriched by the specialized data fields storing the geo information and SQL extensions are introduced by the geospatial extension to realize the described scenarios (e.g., customer-product matching based on geolocations, adapting price information according to the products of interests of potential customers in a certain area, etc.). In typical implementations, the matching of potential customers and products based on geolocations is implemented in the database layer—allowing efficient querying of information based on, for example in one implementation, bounded-box queries (overlaps can be identified by an intersection of bounded-boxes—natively supported by the geo spatial extension—or any other particular shape). Additionally all view types provided by the database can be configured to utilize the geo spatial extension. For this reason, real-time analytics based on geolocations can be performed efficiently even on very complex views. This allows retailers to do detailed analysis of customer demands by analyzing the provided customer information (e.g., location-based product interests, preferred prices of customers based on their geolocation, etc.).

In some implementations, an event stream processor can be used to support consumption of massive numbers of event streams. The event streams provide frequent updates of location-bases product and customer information (i.e., events) which must be persisted and processed by the database.

In some implementations, the described cloud-computing platform allows the sharing of database schemas between extended service (XS) applications and applications deployed to a JAVA container and using a lean JAVA server to offer push notification functionality to send information to clients directly (e.g., price changes, new customers interested in products in a certain location, etc.). In some implementations, a JAVA Web Sockets mechanism is used to push new information to user interfaces (UIs) (e.g., customer mobile devices, retailer web applications, etc.). The web socket events are initialized by database triggers, which in turn use mechanisms provided by the geo spatial extension to react to data updates/inserts in the persistence (e.g., product information, customer interests, etc.).

In some implementations, services are exposed as OData services implemented in an database application server XS engine. Therefore, calculations are performed in the database layer directly and response times are extremely fast. Due to the utilization of the OData protocol, server-side logic is decoupled from UI logic—making it easy to implement applications for a wide range of mobile devices and to implement new applications based on the provided services. Push-notification-functionality is implemented in the JAVA container and able to support the OData protocol by using an OData JAVA library.

Figure 1:
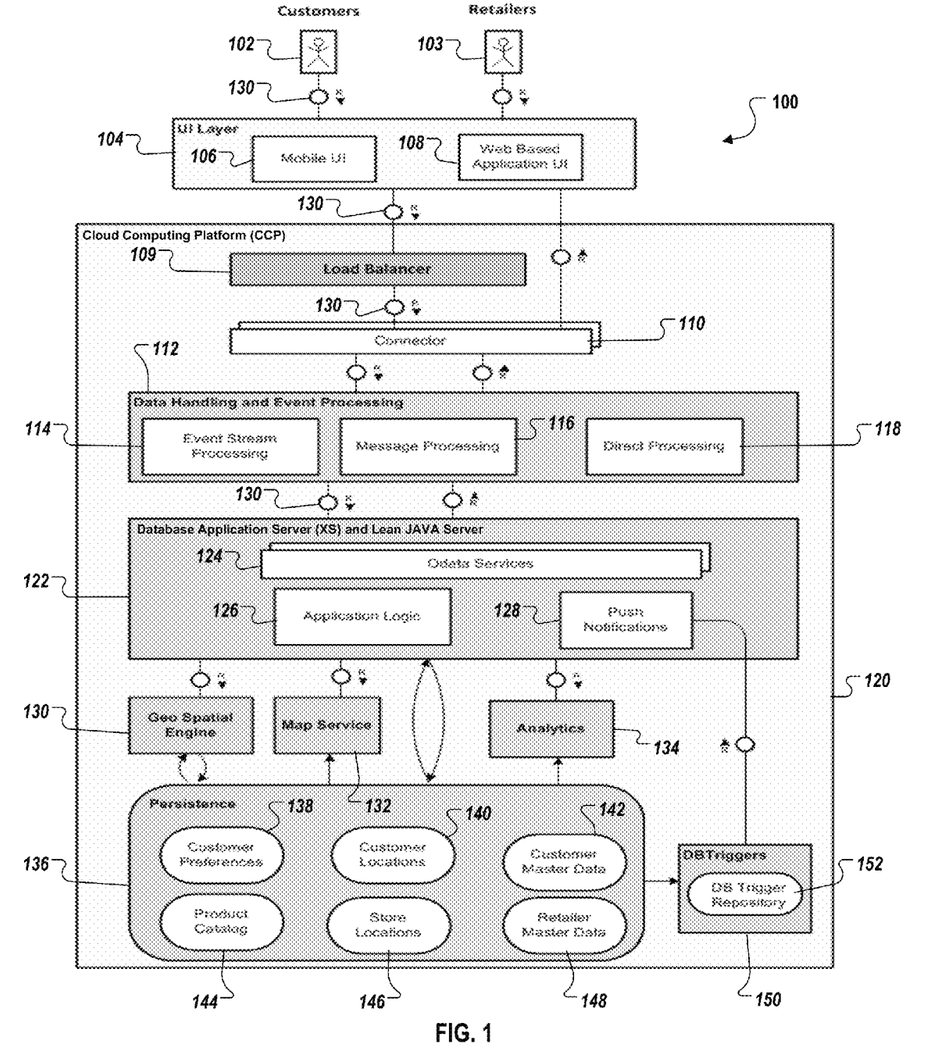
FIG. 1 is a high-level architecture block diagram illustrating an example distributed computing system (EDCS) for providing an on-demand, cloud-based platform exposing a geolocation service according to an implementation.

FIG. 1 is a high-level architecture block diagram illustrating an example distributed computing system (EDCS) 100 for providing an on-demand, cloud-based platform exposing a geolocation service according to an implementation. At a high level, the illustrated EDCS 100 includes or is made up of one or more communicably coupled computers (see FIG. 3) that communicate across a network 130 operating within a cloud-computing-based environment. Although there are only three indicated instances of network 130, one or more other illustrated connections between components of the EDCS 100 can also be considered part of network 130. The illustrated EDCS 100 includes a customer 102 (e.g., buyer), a retailer (e.g., a store owner), a UI layer 104, and a cloud-computing platform (CCP) 120.

The UI layer 104 can be part of a mobile device and provide end-user UIs to the each type of possible end user of the system (e.g., customer (buyer) 102 and retailer 103). For example, the UI layer 104 can provide a mobile UI 106 native application and/or a web-based application UI 108 executing in a browser application. End-user UIs can be implemented on wide range of devices. The end-user UIs utilize the cloud-based framework APIs to connect an on-demand customer to a product matching framework. Mobile UIs 106 are typically used by customers/buyers to configure their product preferences (but can also be done using a web-based application UI 108), to provide current geolocation information, receive special offerings and product hit lists, and to navigate to stores offering products which fit to configured customer preferences. Web-based application UIs 108 are typically used by retailers to maintain product catalogs, analyze customer demands and behavior, etc. As understood by those of skill in the art, mobile UI's 106 and web-based application UIs 108 can be use as needed according to appropriate specifications and are not limited to the above-described typical uses.

The connector 110 is part of the CCP 120 and is an API for the data handling and even processing 112 component. The connector 110 is part of the data handling and event processing component. The connector has to deal with device specifics (mobile UI 106, web-based application UI 108, etc.). The connectors 110 provide an API for the UIs to communicate with the system using the data handling and event processing 112 component (e.g., to utilize corresponding functionalities). The connectors 110 are exposed in the context of the CCP 120. Incoming requests are dispatched to a corresponding connector 110 by a load balancer 109 component of the platform. A connector 110 is needed for each type of UI technology. For example, an IOS device would use one connector while an ANDROID device would use another connector. The connector converts requests into a unified format (e.g., HTTP) which is used by the data handling and even processing 112. Connectors 110 can be installed on mobile devices as plug-ins, libraries, etc. In other words, the connector 110 provides functionality to establish secure, on-demand connectivity to cloud-based computing systems from mobile devices. The connector 110 also allows direct access to the event stream processing 114, message processing 116, and direct processing 118 functionality.

The data handling and even processing (DHEP) 112 is part of the CCP 120 and is responsible for dealing with synchronous and asynchronous communication between UIs running on various devices with the deployed on-demand application. DHEP 112 is a generic component exposed by the CCP 120 and can be utilized in the context of arbitrary cloud applications. The DHEP 112 includes event stream processing 114, message processing 116, and direct processing 118.

Event stream processing (ESP) 114 is a set of technologies designed to support implementation of event-driven architectures. An event manager (e.g., as part of illustrated event stream processing 114) is constantly fielding events, and deciding whether or not to forward the events (singly or in groups) to event consumers for subsequent reactions that can range from simple logging to triggering complex application logic. Usually event stream processing 114 is used when a large number of events occur (e.g., changes of customer 102 geolocations) and based on certain conditions that business logic exposed by a backend service executes (e.g., a customer 102 comes close to a store which offers a product that corresponds to customer 102 preferences).

Message processing 116 is used for asynchronous communication between UI components and backend services. This type communication is used for less frequent events compared to the event stream processing 114. In the context of this invention, a use scenario for message processing is when a retailer 103 decides to make a special offering for a particular customer 102 or a group of customers 102. The corresponding application logic in the backend is triggered by an asynchronous message. As soon as the application logic is triggered, asynchronously data in the persistence layer is updated and push notifications are send to customer 102 devices.

Direct processing 118 supports synchronous point-to-point communication between a UI (e.g., mobile UI 108 and/or web-based application UI 108) and backend services (e.g. for retrieval of product information when browsing a product catalog (e.g., produce catalog 144) or configuring customer 102 preferences (e.g., customer preferences 138)).

The CCP 120 also includes a database application server (XS) and a lean JAVA application server (currently illustrated as a combined component 122) including OData services 124, application logic 126 and push notifications 128. In some implementations, the two application servers are separated. The database application server is a component of the CCP 120. In some implementations, the XS is a JAVA application server (J2EE compliant), .NET or any other type of application server. The XS provides a runtime environment for applications which usually operate in a client-server mode. Applications deployed to an allocation server are accessible using standard protocols like RFC, HTTP/S, etc. The JAVA server executes server-side JavaScript code—e.g., to provide push notification or for other purposes consistent with this disclosure.

The basic functionality of the OData services 124 are to provide on-demand services for customer-to-product matching exposed as CRUD (Create, Read, Update, Delete) services for consumption UIs running on by various types of devices. OData is a standardized data access protocol based on HTTP/S used to expose services either in an on-premise or on-demand architecture. Examples of exposed services are user registration, creation of customer preferences, creation of product entries, requesting product locations, and/or sending customer locations. In some implementations, the OData services 124 are web services that expose, in a standard format, information and provide functionality to the customer 102 and the retailer 103 (e.g., customers can enter master data, register preferences, etc. Retailers can register products, etc.). The OData services 124 decouple application logic 126 from user interfaces (e.g., mobile UI 106 and web-based application UI 108).

The application logic 126 of the exposed services in the context of the customer-to-product matching services is implemented based on functionality provided by the XS of the cloud computing platform (e.g. J2EE server). In some implementations, the application logic 126 is implemented by utilizing other components of the CCP 120 such as the geo-spatial engine 130, map service 132, and analytics 134 as well as OData services, etc. which provide public-facing APIs.

The application logic 126 can also use push notifications 128 to generate notifications. The CCP 120 provides the push notifications 128 framework for sending push notifications to connected devices (e.g., based on web sockets). Examples of possible push notifications are identified customer-to-product matches based on customer preferences and product prices/locations or special offerings from retailers. In some implementations, push notification can work in reverse to allow customers 102 to request bargaining with retailers 103.

The geo spatial engine 130 is part of the CCP 120 and allows storage, processing and analysis of massive amounts of spatially-oriented data (e.g. latitude/longitude) in real-time on geospatial maps. Spatial data provides the ability to answer an entirely new set of business questions with an additional location dimension. It also allows users (e.g., customers 102 and/or retailers 103) to view, understand, interpret, question, and visualize data in a way that reveals relationships, patterns, and trends in the form of maps. The geo spatial engine 130 is an engine running in the CCP 120 which provides geolocation-specific functionality such as efficient storage and retrieval of geo information (e.g., search functionality based on geo bounding boxes), advanced calculations on geolocations and queries for joining geolocations with any other type of data stored in the database (e.g., join locations with products, join locations with customer metadata, etc.). The geo spatial 130 engine is an extension of an underlying in-memory persistence layer in the case of the use of an in-memory database in the CCP 120.

The map service 132 is part of the CCP 120 and provides map visualization and navigation functionality on various devices. For example, external map services such as GOOGLE MAPS, BING, OPEN STREET MAPS, etc. can be used as well internal custom map services.

In the case of the use of an in-memory/column-store database, the underlying column-oriented in-memory persistence layer can be optimized for business-related analytical operations based on massive amounts of stored data (in the case of a conventional database, data can be stored as appropriate to the design of the database). The business-related analytics 134 functionality supports retailers during a process of optimizing offerings in regarding potential customer preferences and their current locations. Analytics 134 can also provide analytics based on geolocation functionality typically used by retailers 103. This includes analysis of customer 102 behavior, who visited shops, what was purchased, etc.

All data created and used by the application services are stored in a persistence layer 136 providing powerful analytical functionality and supports efficient geo spatial operations. The persistence layer 136 includes customer preferences 138, customer locations 140, customer master data 142, produce catalog 144, store locations 146, and retailer master data 148. The customer preferences 138 are, in some implementations, a database table which stores individual customer preferences. For example, customer preferences 138 are virtual "wish lists" of customers and provide information about product details and acceptable price ranges for a product. Customer locations 140 are stored, in some implementations, in a particular data base table. As soon as a customer 102 starts a shopping trip, the location data is frequently updated. This data is utilized by the application logic 126 to identify customer-to-product matches based on customer preferences 138 and the current customer location.

Customer master data 142 (e.g., address, telephone number, mobile device type, age, etc.) is stored, in some implementations, in a database table. This data is provided during user registration and can be updated by the customer 102.

The product catalog 144 can be represented, in some implementations, in a database table which stores all products offered by registered retailers 103 including price information and product locations (e.g., a link to shop locations). The customers 102 can configure their preferences (e.g., customer preferences 138) based on the content of the product catalog 144. Retailers 103 can maintain content for the product catalog 144.

Retailers 103 can provide information related to their stores which, in some implementations, can be stored in a particular database table (e.g., store locations 146).

Retailer master data 148 (address, telephone, age, etc.) can be stored, in some implementations, in a database table. This data can be provided during retailer registration and can be updated by the retailer 103.

Database triggers (DB Triggers) 150 are procedural codes automatically executed in response to certain events occurring on a particular table or view in a database. For example, these events can be create, update, and delete operations on certain data entities (e.g., customer preference, location, etc.). These DB triggers 150 are used to trigger the execution of application logic 126 as a reaction of modification of application data (e.g., an update of price information related to a particular product can trigger a push notification 128 to mobile devices of customers 102 where a product is declared as a customer preference).

Figure 2A:
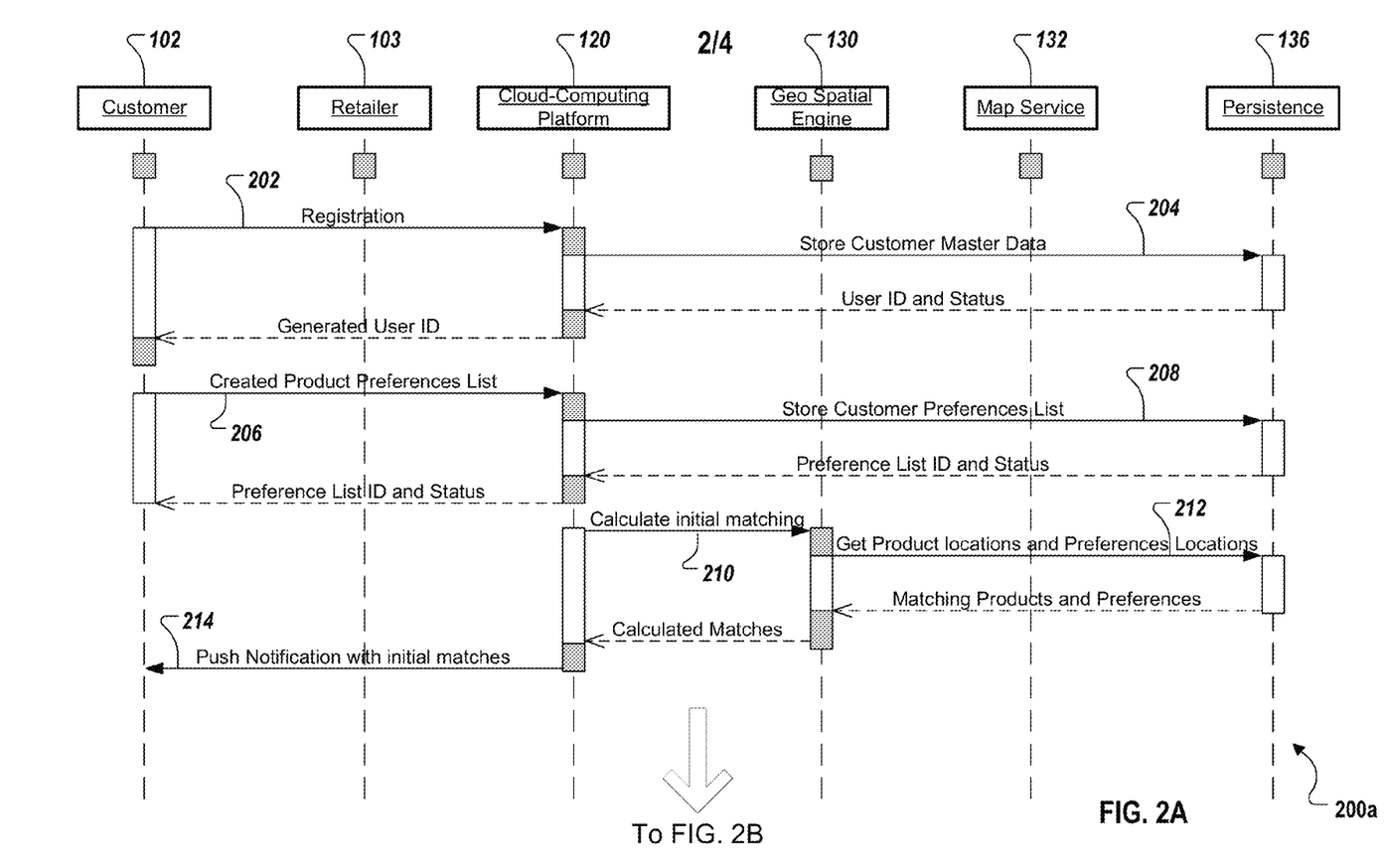
FIGS. 2A & 2B represent a sequence diagram illustrating typical interactions with the described geolocation service according to an implementation.
Figure 2B:
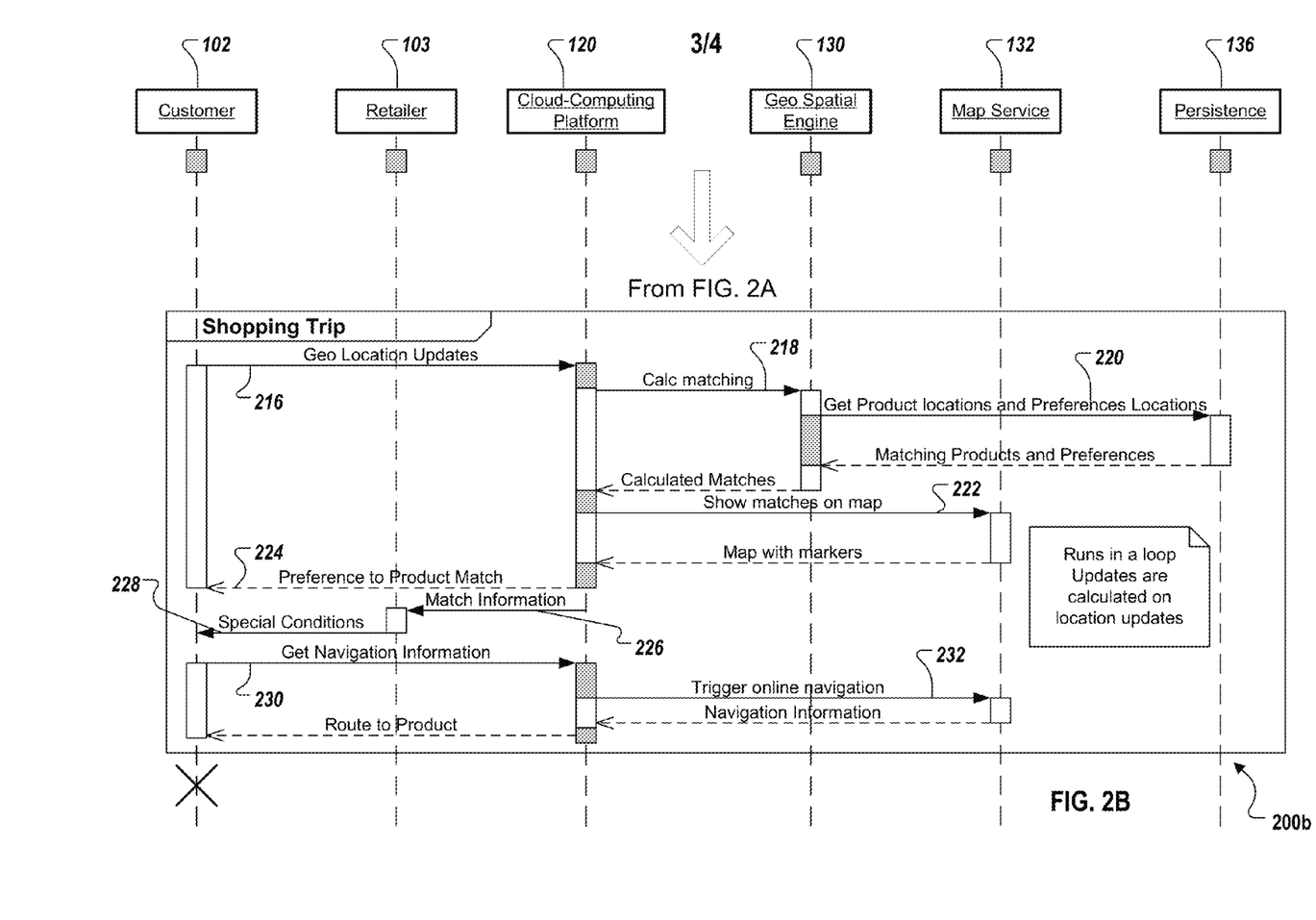

FIGS. 2A & 2B represent a sequence diagram of a method (200a & 200b) illustrating typical interactions with the described geolocation service according to an implementation. For clarity of presentation, the description that follows generally describes method 200 in the context of FIGS. 1 and 3. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

At 202, a customer 102 registers with the CCP 120 (note that for the purposes of FIGS. 2A and 2B, operations related to the application logic 126 exposed as OData services 124 executed in the database application server 122 are represented as a single lane "Cloud Computing Platform 120" for simplicity. The corresponding customer master data (e.g., name, address, etc.) is created (the customer 102 can access the CCP 120 services (e.g., OData services 124) using a registered mobile device (e.g., a native application 106 installed and registered with the service) or using a web-application 108 inside a browser to access the platform services). As described above, registration requests from the customer 102 are passed through the data handling and even processing 112 for processing. From 202, method 200a proceeds to 204.

At 204, the customer master data is stored in a persistence, such as persistence 136, in customer master data 142, another illustrative subcomponent of persistence 136, and/or another data storage location. The persistence returns a user ID and status to the CCP 120 and a user ID (and in some implementations a password and/or other data) is returned to the customer 102. From 204, method 200a proceeds to 206.

At 206, a customer 102 creates and transmits a list with product preferences (e.g., a wish list) that they would like to purchase to the CCP 120. In some implementations, the list contains information regarding the location of the product, a price range for each product the customer is willing to pay, a timeframe for the shopping trip (e.g., data, start time, end time, etc.), and/or other data. From 206, method 200a proceeds to 208.

At 208, the product preferences are stored in the persistence 136, for example in the customer preferences 138. A preference list ID and status is returned to the cloud computing platform 120 and then to the customer 102. From 208, method 200a proceeds to 210.

At 210, an initial matching of customer preferences with the stores product catalog 144 (associated with persistence 136) is determined/calculated by the CCP 120. The matching algorithm (e.g., associated with the application logic 126 of the application server 122) takes into account the geolocations provided by the customer preferences list stored in customer preferences 138 and the geolocations of the retailer shops (shop locations 146). The geolocation-based matching is performed using the geo spatial engine 130. From 210, method 200a proceeds to 212.

At 212, the resulting list of matches of products to customer preferences based on geolocations (e.g., product locations and preference locations) is then filtered by the provided price ranges (e.g., in the customer preferences 138) and the results returned to the geo spatial engine 130 and then to the CCP 120. From 212, method 200a proceeds to 214.

At 214, the calculated matches are sent to the customer 102 (e.g., using a push notification) mobile device—which can be accessed using the mobile UI 106 application or the web-based application UI 108. From 214, method 200a proceeds to 216 of FIG. 2B.

Note that at any time the customer can signal the platform that a shopping trip into a certain area has started.

Referring now to FIG. 2B, at 216, the current customer geolocation is sent to the CCP 120 on a regular basis (e.g., a defined interval—every X minutes or based on distance moved geographically, etc.). From 216, method 200b proceeds to 218.

At 218, on every location update by the geo spatial engine 130, the CCP 120 (and in some implementations the geo spatial engine 130 can assist) determines/calculates if there is any match between a customer preference 136 and an actual product in the product catalog 144 based on the provided criteria (e.g., location, price range, etc. in customer preferences 138) and the customer 102 location. Several matching types are calculated (e.g., closest hit, best price, etc.), returned to the geo spatial engine 130 and then to the CCP 120. From 220, method 200b proceeds to 222.

At 222, the CCP 120, requests that the map service 132 determine mapping locations for matches. A map with markers is returned to the CCP 120. From 222, method 200b proceeds to 224.

At 224, the CCP 120 returns customer product match preferences to the customer 102 mobile device. From 224 method 200b proceeds to 226.

At 226, the CCP 120 transmits the match information to the retailer 103 to inform the retailer 103 which matches apply to the customer 102. Potential user-to-product matches are sent to the corresponding retailers and the retailers can decide to make special prices or conditions for the customer 102 in order to make an offer more attractive. From 226, method 200b proceeds to 228.

At 228, the retailer 103 transmits any special conditions 228 to the customer 102 mobile device. Such a special offer (e.g., for high-price or specialty products) are can, in some implementations, be pushed immediately to the customer 102 device (e.g., using push notifications, text messages, phone calls, etc.) where they are visualized using the preference to product match in 224. In some implementations, various visualization modes can be supported (e.g., maps, lists, etc.). In some implementations, the customer 102 can request detailed information from the product catalog according to every identified match using a request to the CCP 120. From 228, method 200b proceeds to 230.

At 230, the customer 102 requests navigation information from the CCP 120 for an offered product that they wish to buy. From 230, method 200b proceeds to 232.

At 232, the navigation request is transmitted to the map service 132 which returns navigation information to the CCP 120 and then to the customer 102. After 232, method 200b stops.

Figure 3:
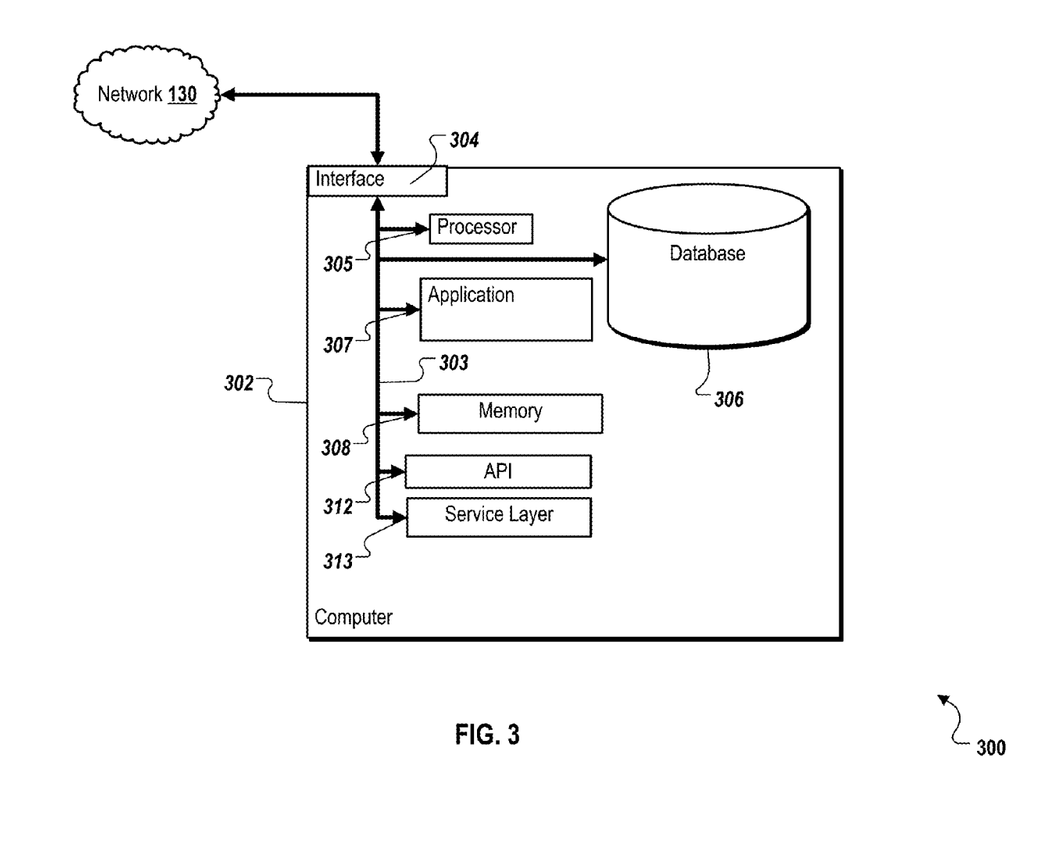
FIG. 3 is a block diagram of an exemplary computer used in the EDCS according to an implementation.

FIG. 3 is a block diagram 300 of an exemplary computer 302 used in the EDCS 100 according to an implementation. The illustrated computer 302 is typically of a mobile design, but is intended to encompass any computing device such as a server, desktop computer, laptop/notebook computer, wireless data port, smart phone, personal data assistant (PDA), tablet computing device, one or more processors within these devices, or any other suitable processing device, including both physical and/or virtual instances of the computing device. Additionally, the computer 302 may comprise a computer that includes an input device, such as a keypad, keyboard, touch screen, or other device that can accept user information, and an output device that conveys information associated with the operation of the computer 302, including digital data, visual and/or audio information, or a GUI.

The computer 302 can process for/serve as a client (e.g., client 102), UI layer 104 (or one or more subcomponents), connector 110, data handling and event processing 114 (or one or more subcomponents), or the CCP 120 (or one or more subcomponents), and/or any other component of the EDCS 100 (whether or not illustrated). The illustrated computer 302 is communicably coupled with a network 130. In some implementations, one or more components of the computer 302 may be configured to operate within a cloud-computing-based environment.

At a high level, the computer 302 is an electronic computing device operable to receive, transmit, process, store, or manage data and information associated with the EDCS 100. According to some implementations, the computer 302 may also include or be communicably coupled with a cloud-computing server, application server, e-mail server, web server, caching server, streaming data server, business intelligence (BI) server, and/or other server.

The computer 302 can receive requests over network 330 from a client application (e.g., a mobile UI 106 and/or web-based application UI 108 executing on another computer 302 in use by a customer 102) and responding to the received requests by processing the said requests in an appropriate software application. In addition, requests may also be sent to the computer 302 from internal users (e.g., from a command console or by other appropriate access method), external or third-parties, other automated applications, as well as any other appropriate entities, individuals, systems, or computers.

Each of the components of the computer 302 can communicate using a system bus 303. In some implementations, any and/or all the components of the computer 302, both hardware and/or software, may interface with each other and/or the interface 304 over the system bus 303 using an API 312 and/or a service layer 313. The API 312 may include specifications for routines, data structures, and object classes. The API 312 may be either computer-language independent or dependent and refer to a complete interface, a single function, or even a set of APIs. The service layer 313 provides software services to the computer 302 and/or the EDCS 100. The functionality of the computer 302 may be accessible for all service consumers using this service layer. Software services, such as those provided by the service layer 313, provide reusable, defined business functionalities through a defined interface. For example, the interface may be software written in JAVA, C++, or other suitable language providing data in extensible markup language (XML) format or other suitable format. While illustrated as an integrated component of the computer 302, alternative implementations may illustrate the API 312 and/or the service layer 313 as stand-alone components in relation to other components of the computer 302 and/or EDCS 100. Moreover, any or all parts of the API 312 and/or the service layer 313 may be implemented as child or sub-modules of another software module, enterprise application, or hardware module without departing from the scope of this disclosure.

The computer 302 includes an interface 304. Although illustrated as a single interface 304 in FIG. 3, two or more interfaces 304 may be used according to particular needs, desires, or particular implementations of the computer 302 and/or EDCS 100. The interface 304 is used by the computer 302 for communicating with other systems in a distributed environment—including within the EDCS 100—connected to the network 330 (whether illustrated or not). Generally, the interface 304 comprises logic encoded in software and/or hardware in a suitable combination and operable to communicate with the network 330. More specifically, the interface 304 may comprise software supporting one or more communication protocols associated with communications such that the network 330 or interface's hardware is operable to communicate physical signals within and outside of the illustrated EDCS 100.

The computer 302 includes a processor 305. Although illustrated as a single processor 305 in FIG. 3, two or more processors may be used according to particular needs, desires, or particular implementations of the computer 302 and/or the EDCS 100. Generally, the processor 305 executes instructions and manipulates data to perform the operations of the computer 302. Specifically, the processor 305 executes the functionality required for providing the described on-demand, cloud-based platform exposing a geolocation service.

The computer 302 also includes a database 306 and memory 308 that hold data for the computer 302 and/or other components of the EDCS 100. Although illustrated as a single database 306 and memory 308 in FIG. 3, two or more databases 308 and memories 308 may be used according to particular needs, desires, or particular implementations of the computer 302 and/or the EDCS 100. While database 308 and memory 308 are illustrated as integral components of the computer 302, in alternative implementations, the database 306 and memory 308 can be external to the computer 302 and/or the EDCS 100. In some implementations, the database can be a conventional database or an in-memory database, or a mix of both. In some implementations, the database 306 and memory 308 can be combined into one component.

The application 307 is an algorithmic software engine providing functionality according to particular needs, desires, or particular implementations of the computer 302 and/or the EDCS 100, particularly with respect to functionalities required for providing the described on-demand, cloud-based platform exposing a geolocation service. For example, application 307 can serve as the UI layer 104 (or one or more subcomponents), connector 110, data handling and event processing 114 (or one or more subcomponents), the CCP 120 (or one or more subcomponents), and/or any other component of the EDCS 100 (whether or not illustrated). Further, although illustrated as a single application 307, the application 307 may be implemented as multiple applications 307 on the computer 302. In addition, although illustrated as integral to the computer 302, in alternative implementations, the application 307 can be external to the computer 302 and/or the EDCS 100.

There may be any number of computers 302 associated with, or external to, the EDCS 100 and communicating over network 330. Further, the term "client," "user," and other appropriate terminology may be used interchangeably as appropriate without departing from the scope of this disclosure. Moreover, this disclosure contemplates that many users may use one computer 302, or that one user may use multiple computers 302.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus," "computer," and/or "electronic computer device" (or equivalent as understood by one of ordinary skill in the art) refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers using this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:
1. A computer-implemented method comprising:
    storing, in a persistence, customer master data received as part of a customer registration process;
    storing, in the persistence, customer preferences received in a customer-created product preferences list;
    receiving geolocation updates from a customer mobile device;
    determining if there is a match between a particular customer preference and a product in a product catalog based on received customer preferences and the customer location based on the received geolocation updates;
    transmitting a determined match to the retailer to be used by the retailer to transmit special conditions related to the match to the customer mobile device;
    transmitting generated determined matches to display on a map to the customer mobile device; and
    transmitting online navigation data to the customer mobile device.

2. The method of claim 1, wherein the customer preferences are based on data obtained from the product catalog stored in the persistence.

3. The method of claim 1, wherein the store locations and the retailer master data are received from retailers as part of at least a retailer registration process.

4. The method of claim 1, further comprising:
determining initial matching between the customer master data, the customer preferences, store locations, and retailer master data; and
responsive to a determination of initial matching, generating a push notification for transmission to the customer.

5. The method of claim 4, further comprising, as part of the determination of initial matching:
obtaining product locations and customer preference locations from the persistence; and
filtering matches between the customer master data, the customer preferences, the store locations, and the retailer master data by price ranges associated with the customer preferences.

6. The method of claim 1, further comprising:
receiving an indication of grouping from a plurality of customers seeking to receive special prices or product offerings by retailers associated with a geographical region;
determining if the plurality of customers are interested in a particular product in the geographical region; and
transmitting a special price or product offering to one or more customers of the plurality of customers.

7. A non-transitory, computer-readable medium storing computer-readable instructions executable by a computer and configured to:
store, in a persistence, customer master data received as part of a customer registration process;
store, in the persistence, customer preferences received in a customer-created product preferences list;
receive geolocation updates from a customer mobile device;
determine if there is a match between a particular customer preference and a product in a product catalog based on received customer preferences and the customer location based on the received geolocation updates;
transmit a determined match to the retailer to be used by the retailer to transmit special conditions related to the match to the customer mobile device;
transmit generated determined matches to display on a map to the customer mobile device; and
transmit online navigation data to the customer mobile device.

8. The medium of claim 7, wherein the customer preferences are based on data obtained from the product catalog stored in the persistence.

9. The medium of claim 7, wherein the store locations and the retailer master data are received from retailers as part of at least a retailer registration process.

10. The medium of claim 7, further comprising instructions to:
determine initial matching between the customer master data, the customer preferences, store locations, and retailer master data; and
responsive to a determination of initial matching, generate a push notification for transmission to the customer.

11. The medium of claim 10, further comprising instructions to, as part of the determination of initial matching:
obtain product locations and customer preference locations from the persistence; and
filter matches between the customer master data, the customer preferences, the store locations, and the retailer master data by price ranges associated with the customer preferences.

12. The medium of claim 7, further comprising instructions to:
receive an indication of grouping from a plurality of customers seeking to receive special prices or product offerings by retailers associated with a geographical region;
determine if the plurality of customers are interested in a particular product in the geographical region; and
transmit a special price or product offering to one or more customers of the plurality of customers.

13. A system, comprising:
a memory;
at least one hardware processor interoperably coupled with the memory and configured to:
store, in a persistence, customer master data received as part of a customer registration process;
store, in the persistence, customer preferences received in a customer-created product preferences list;
receive geolocation updates from a customer mobile device;
determine if there is a match between a particular customer preference and a product in a product catalog based on received customer preferences and the customer location based on the received geolocation updates;
transmit a determined match to the retailer to be used by the retailer to transmit special conditions related to the match to the customer mobile device;
transmit generated determined matches to display on a map to the customer mobile device; and
transmit online navigation data to the customer mobile device.

14. The system of claim 13, wherein the store locations and the retailer master data are received from retailers as part of at least a retailer registration process.

15. The system of claim 13, further configured to:
determine initial matching between the customer master data, the customer preferences, store locations, and retailer master data; and
responsive to a determination of initial matching, generate a push notification for transmission to the customer.

16. The system of claim 15, further configured to, as part of the determination of initial matching:
obtain product locations and customer preference locations from the persistence; and
filter matches between the customer master data, the customer preferences, the store locations, and the retailer master data by price ranges associated with the customer preferences.

17. The system of claim 13, further configured to:
receive an indication of grouping from a plurality of customers seeking to receive special prices or product offerings by retailers associated with a geographical region;
determine if the plurality of customers are interested in a particular product in the geographical region; and
transmit a special price or product offering to one or more customers of the plurality of customers.

* * * * *